(No Model.)
F. A. HUMPHREY.
MARKING GAGE.
No. 349,102. Patented Sept. 14, 1886.
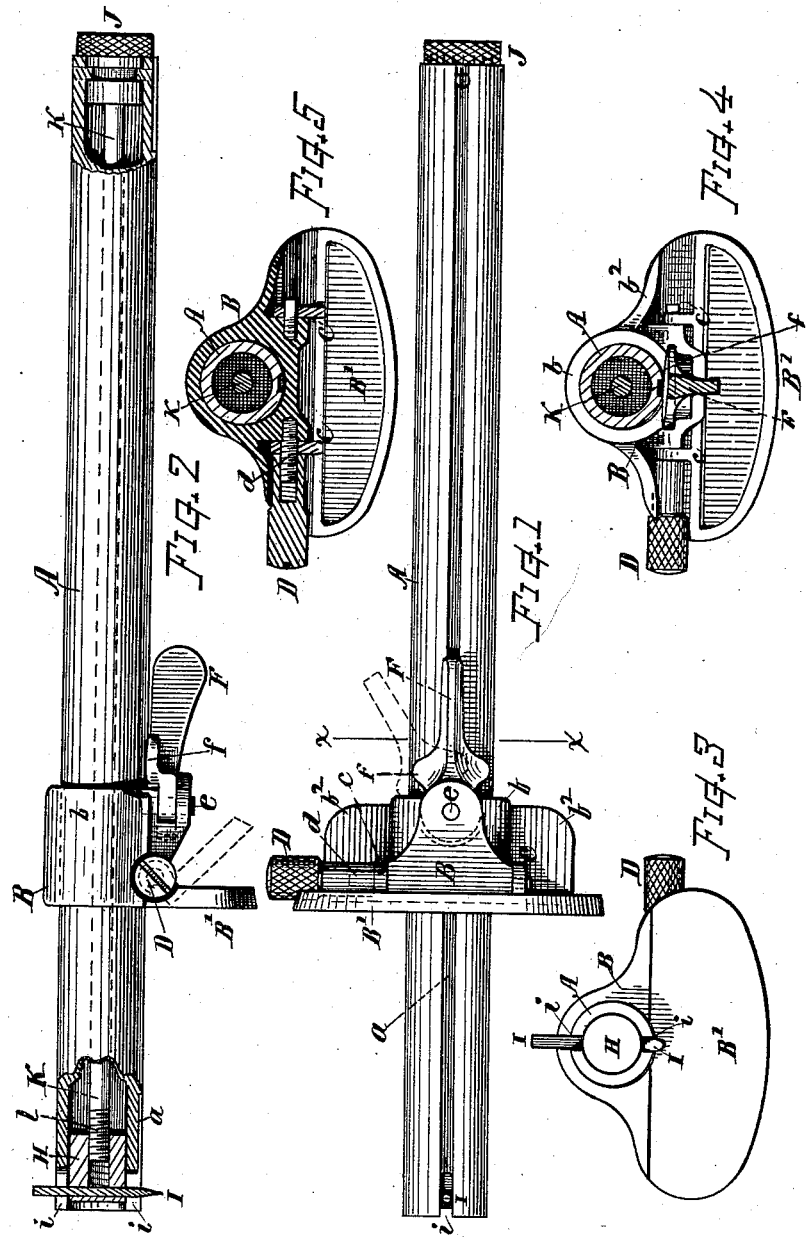
WITNESSES
H. P. Baston
S. E. King
INVENTOR
Frank A. Humphrey
By Chas. H. Burleigh
Attorney

UNITED STATES PATENT OFFICE.

FRANK A. HUMPHREY, OF WORCESTER, MASSACHUSETTS.

MARKING-GAGE.

SPECIFICATION forming part of Letters Patent No. 349,102, dated September 14, 1886.

Application filed April 17, 1886. Serial No. 199,275. (No model.)

*To all whom it may concern:*

Be it known that I, FRANK A. HUMPHREY, a citizen of the United States, residing at Worcester, in the county of Worcester and State of Massachusetts, have invented certain new and useful Improvements in Marking-Gages, of which the following, together with the accompanying drawings, is a specification sufficiently full, clear, and exact to enable persons skilled in the art to which this invention appertains to make and use the same.

The object of my present invention is to provide a marking-gage of neat, practical, and convenient construction, and to afford a tool economical to manufacture and of superior efficiency and accuracy for use.

My invention consists in a gage constructed as shown and described, and in certain peculiarities or features of improvement, as more fully hereinafter explained, the particular subject-matter claimed being hereinafter definitely specified.

In the drawings, Figure 1 is a bottom view of my improved marking-gage. Fig. 2 is a side view of the same, the ends being shown in section the better to illustrate the detail of construction. Fig. 3 is an end view looking toward the face of the adjustable head. Fig. 4 is a section at line $x\ x$, Fig. 1, looking toward the back of the head. Fig. 5 is a section through the hinging of the guard-lip.

In my improved marking-gage I construct the bar or shaft A of a cylindrical metal tube having in its surface a longitudinal groove, $a$, preferably at the lower side thereof. Upon this bar A is mounted the sliding guard or head B, which is constructed, as shown, with a hub, $b$, fitting over the bar A with a sufficient degree of looseness to slide freely thereon. The lower dependent part of the guard-plate or lip B' is hinged to said hub $b$ transversely to the bar A, and with the joint substantially in line with the lower edge thereof, so that said lip can be inclined backward at an angle or set in position perpendicular to the bar, as desired. Wing-braces $b^2$ may be formed on the sides of the hub $b$, as indicated, for supporting the lip or hinging at the sides thereof, thus giving a strong but light construction to the head.

The lip B' is preferably of ellipsoidal shape in outline with flat face surface perpendicular to the axis of the bar, the hub and lip being formed of metal, and the parts connected to each other by means of small hinging ears $c$ $c'$ and axial hinging pins or studs, as indicated. At one side the axial stud or hinge-pin $d$ is extended beyond the ear $c$, and is screw-threaded, and a long internally-threaded stud or thumb-nut, D, is fitted thereon, which screws firmly against the side of the ear $c$, and thus retains the guard or plate B' at positions of adjustment. The outer end of the stud or nut D projects beyond the edge of the plate B' sufficiently far to give the necessary grip for conveniently operating it.

The plate B' is recessed on its rear upper edge to allow space for the screw-stud D. The end of the stud D is nicked to receive a screw-driver. Said nick may be omitted, if preferred. By loosening the thumb-screw D the lip or guard B' is released, so that it can be set back, as per dotted lines, Fig. 2. Then by tightening said screw the hinge is clamped so as to retain the parts at position of adjustment. This method and construction for securing the adjustment of the guard by means of a screw centered on the hinging-pin for clamping the hinge-joint is a feature of my invention.

At the rear lower part of the head B, I arrange a small thumb-lever, F, which extends backward along the bar, and is pivoted to the head by the pin $e$, so as to swing horizontally, as indicated by dotted line, Fig. 1. Said lever is provided with an inclined or cam surface at $f$, which is arranged to clamp against the inner side of the bar A when said lever is swung into position, as shown in full lines, Figs. 1 and 4, and thus bind or clamp the head B in position on the bar A, and to relieve the clamping action when swung to one side, (as per detail, dotted line, Fig. 1,) to permit of the head being moved along the bar A freely. The pin $e$, which fulcrums the binding-lever F, extends into the groove $a$, and prevents the head B from turning around upon the bar A.

The construction and arrangement of the binding-lever F in combination with the gage-bar and head is a feature of my invention. I prefer to insert the pin $e$ from the interior of the head before the head is slipped over the bar, so that when the parts are put together the head of the pin $e$ will run in the groove $a$, and there can be no liability of the pin getting out of place.

Another feature of my invention consists in the means for adjusting the marking tooth or point I. Said tooth is preferably supported in a block or nut, H, that is fitted to move longitudinally within the end of the tubular bar A. The ends of the tooth project through longitudinal slots $i$, formed in the top and bottom of the tube, and thus prevent the nut from turning around within said tube. At the opposite end of the tubular bar is a stopper or thumb-head, J, confined within the tube by a groove and lug against longitudinal movement, but free to rotate therein, and projecting sufficiently for giving a hold for operating it. From this head J a rod or bolt, K, extends to the nut H, and is fitted into the nut with a screw-thread, as indicated at $l$, thus forming a micrometer adjustment, whereby the marking-tooth can be very conveniently set forward or back to correct any inaccuracy in the adjustment of the head B after it has been clamped in place by the thumb-lever F, when minute accuracy is required.

If desired, the nut H can be made to be held from rotating within the bar by means of a groove and spline, and the marker may in some instances be connected to the extreme end of the nut, and said nut be extended beyond the end of the tubular bar.

In some instances it may be desired to employ the head-clamping lever F in the construction of gages having a fixed tooth or without the tooth-adjusting devices H J K, and vice versa, and either of the said devices named, in connection with a head on which the guard-lip is hinged or not hinged, as required, and I include such uses as within the scope of my invention.

It will be understood that I do not herein broadly claim the hinging for adjustment of the face in a marking-gage, as I am aware that prior patents show gages wherein the head or guard-face is made capable of adjustment to an inclined position in relation to the line of the bar; but in such gages the devices for effecting the adjustment are of different construction from the peculiar construction herein specified, and such gages are hereby disclaimed.

I am also aware that gages have been heretofore provided with an adjustable second marking-tooth in connection with an auxiliary sliding bar for carrying the same; hence I do not wish to be understood as including, broadly, an adjustable marking-tooth, but the construction herein shown and described, as within the scope of my invention.

What I claim as of my invention, and desire to secure by Letters Patent, is—

1. A marking-gage consisting of a hollow cylindrical tube provided with a marking-tooth at the end thereof, combined with an adjustable head composed of a cylindrical hub having an ellipsoidal guard-plate projecting therefrom, and a clamping-lever pivoted on said head at the back of the guard, and acting against said bar to retain the head at position of adjustment, substantially as set forth.

2. A marking-gage wherein the adjustable head B is provided with a movable guard-lip, B', hinged thereto in the manner described, in combination with a bar and marking-point, and with a nut, D, axially disposed in relation to the hinge, and fitted to the screw-threaded end of the hinge-pin $d$, and adapted for retaining said guard-lip at position of adjustment by clamping the hinge-joint, substantially as hereinbefore set forth.

3. In a marking-gage, the combination, substantially as described, of the bar A, carrying the marking-point, the head B, mounted to slide on said bar, and the laterally-swinging lever F, pivoted to the under side of said head on an axis perpendicular to the axis of the bar, and having on its upper side a cam-surface or incline, as at $f$, for clamping against said bar, for the purposes set forth.

4. A gage having a hollow cylindrical bar provided with a longitudinal groove, as $a$, in its exterior surface, and carrying a marking-tooth, a sliding head provided with a backwardly-swinging lip, means for retaining said lip at positions of adjustment, and a clamp-lever pivoted to said head and having an incline or cam-surface, $f$, for contact therewith, and the pin $e$, extending through the head and into the groove $a$, as and for the purposes set forth.

5. The combination, in a marking-gage, of a hollow tubular bar, a head having a dependent guard-lip adjustable on said bar and provided with a clamping-lever for retaining said head at positions of adjustment, a sliding nut carrying the marking-tooth, and a micrometer adjusting-screw passing through the tube and provided at the opposite end of said bar with an operation head for regulating said tooth, substantially as set forth.

6. The combination, with the tubular bar A, having an adjustable gage-head mounted thereon, of the non-rotatable nut H, carrying the marking-tooth I, fitted within the end of said bar, and the rotatable rod K, extending through said tubular bar and having one end screw-threaded to said nut, as at $l$, and the opposite end provided with a thumb-head, J, rotatable with the rod, but confined against longitudinal movement within the end of said bar, substantially as and for the purpose set forth.

7. The marking-gage having a cylindrical tubular bar, A, slotted, as at $i$, the cylindrical block or nut H, fitting within the tube, and the marking-tooth I, fixed into and projecting from said block through the slots $i$, for preventing rotation thereof, and an adjustable gage-head, substantially as set forth.

Witness my hand this 10th day of April, A. D. 1886.

FRANK A. HUMPHREY.

Witnesses:
CHAS. H. BURLEIGH,
HERBERT P. BARTON.